Feb. 2, 1932.  M. RADZIEVICH  1,843,885
DUMP CAR AND DUMPING ATTACHMENT THEREFOR
Filed Feb. 3, 1931   2 Sheets-Sheet 2
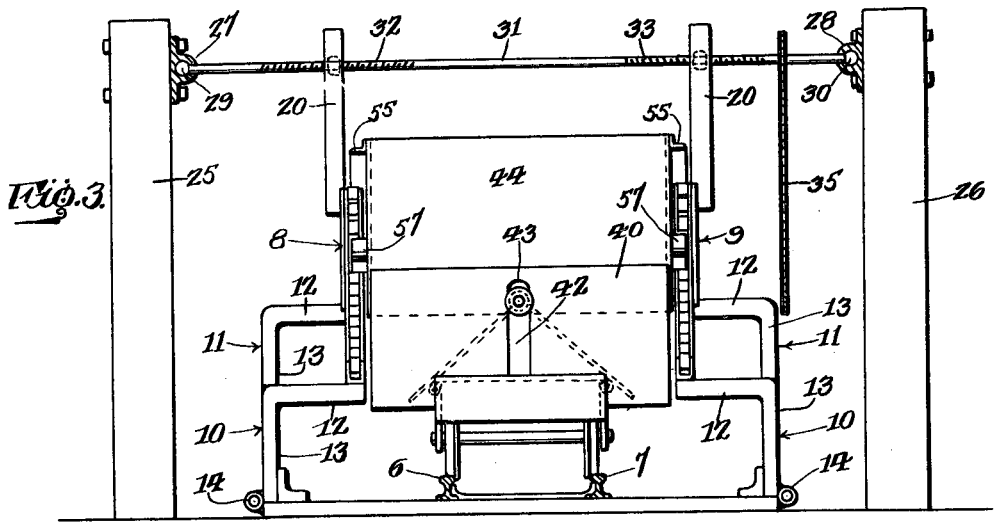
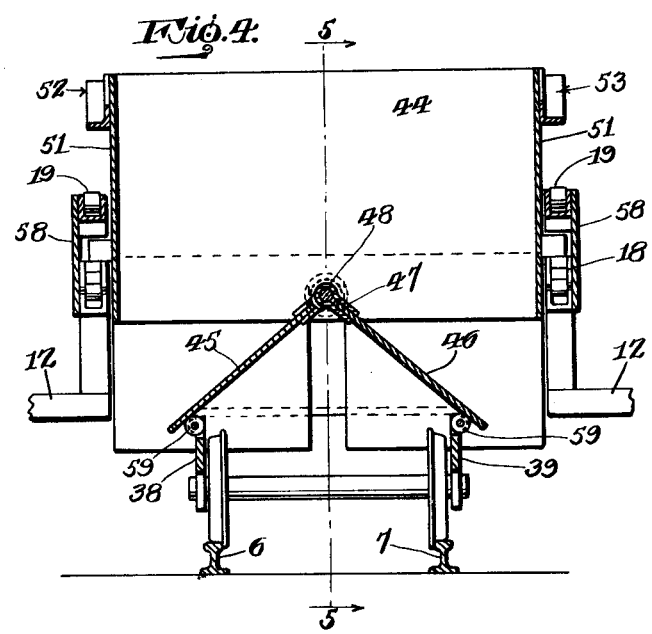
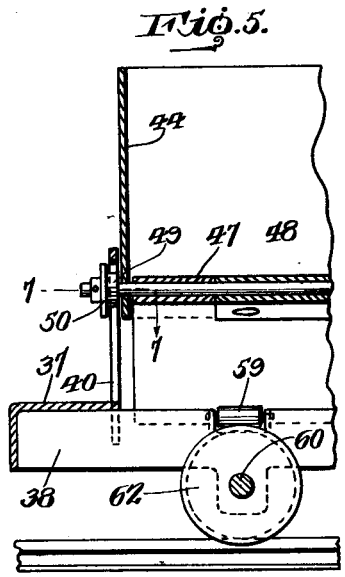
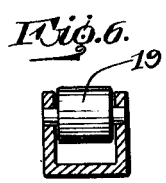
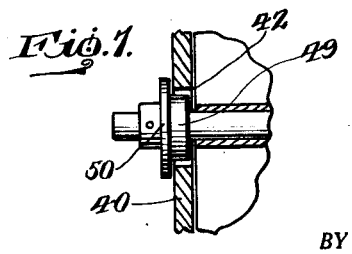
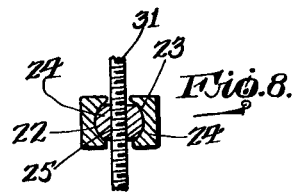
INVENTOR.
Michael Radzievich
BY
Geo. P. Kimmel
ATTORNEY.

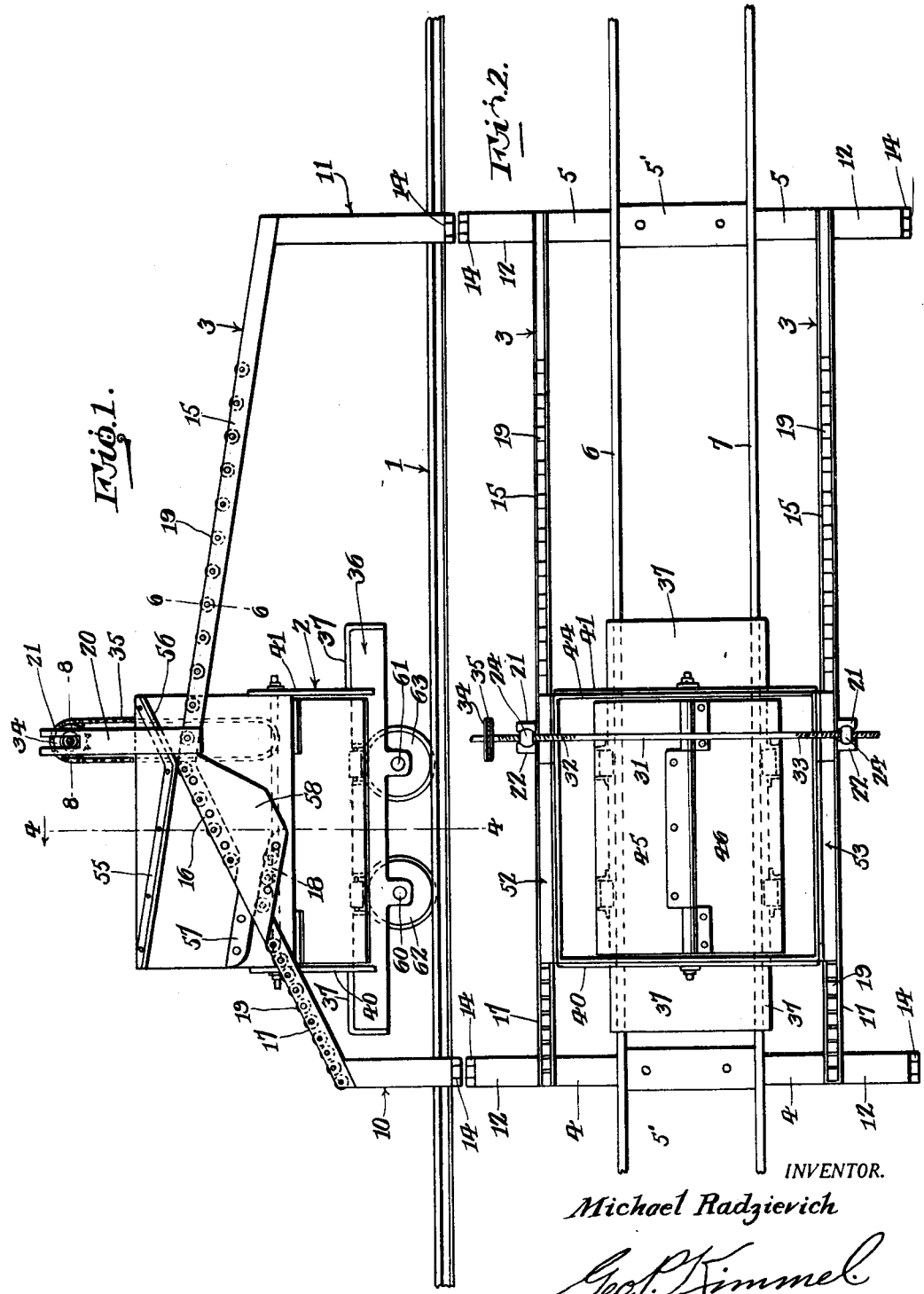

Patented Feb. 2, 1932

1,843,885

UNITED STATES PATENT OFFICE

MICHAEL RADZIEVICH, OF MINERSVILLE, PENNSYLVANIA

DUMP CAR AND DUMPING ATTACHMENT THEREFOR

Application filed February 3, 1931. Serial No. 513,197.

This invention relates to a dump car and a dumping attachment therefor and has for its object to provide, in a manner as hereinafter set forth means whereby the car may have the contents thereof automatically dumped therefrom without the necessity of checking the travel of the car.

A further object of the invention is to provide, in a manner as hereinafter set forth, a car having a dumping bottom and means coacting with elements carried by the car to automatically provide for the shifting of the bottom of the car to dumping position for discharge and to further provide for automatically returning the car bottom to non-dumping position after the discharge of the load.

A further object of the invention is to provide, in a manner as hereinafter set forth, a car having a dumping bottom and means arranged in the path of the travel of the car and coacting with the latter to automatically provide for the shifting of the bottom of the car to discharge position, and further with said means so set up as to enable it to be shifted clear of the path of the travel of the car whereby the latter may pass through said means with its bottom in non-dumping position.

Further objects of the invention are to provide, in a manner as hereinafter set forth, a dump car and a dumping attachment or mechanism therefor which are simple in construction and arrangement, strong, durable, compact, thoroughly efficient when used, readily assembled, and comparatively inexpensive to set up.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to, which fall within the scope of the claims hereunto appended.

In the drawings wherein like reference characters denote corresponding parts throughout the several views:—

Figure 1 is a side elevation of a dump car and a dumping attachment or mechanism therefor and further illustrating the car in dumping position.

Figure 2 is a top plan view of the car and the dumping attachment or mechanism therefor and illustrating the car in dumping position.

Figure 3 is a front elevation of the car and the dumping attachment or mechanism therefor and illustrating the same installed with respect to a car track.

Figure 4 is a section on line 4—4 Figure 1.
Figure 5 is a section on line 5—5 Figure 4.
Figure 6 is a section on line 6—6 Figure 1.
Figure 7 is a section on line 7—7 Figure 5.
Figure 8 is a section on line 8—8 Figure 1.

Referring to the drawings in detail, 1 denotes a car track upon which the dump car travels and the latter is referred to generally at 2. The dumping attachment or mechanism which associates with the car 2 is generally indicated at 3 and includes a pair of spaced, parallel, sidewise opposed base bars 4, 5 which are arranged below and project laterally from the track rails 6, 7. The bars 4, 5 are anchored to plates 5' arranged between the rails 6, 7.

Hinged to the base bars 4, 5 at both ends of said plates are the lower ends of oppositely shiftable elevating elements 8, 9 and each of which consists of a pair of angle shaped supports 10, 11 arranged in spaced relation and with each support having a horizontal leg 12 which extends inwardly from the upper end of a vertical leg 13. The support 10 is of less height than the support 11. The hinge connections between the legs 12 and the plates 4, 5 are indicated at 14.

Fixed to the inner ends of the horizontal legs of the supports 10, 11 is a combined elevating and lowering track consisting of a part 15 extending at an upward inclination from its rear to its forward end. The rear end of part 15 is secured to the leg 12 of the support 11. The part 15 has its forward end merge into a downwardly inclined part 16 which aligns with and is spaced from a downwardly inclined part 17 and having its lower end secured to the inner end of the leg 12 of the support 10. Extending rearwardly from the upper end of the part 17 and inclining downwardly from its forward to its rear end is a part 18 of the elevating and lowering track. The parts 15, 16, 17 and 18 are of channeled shape cross section and each is provided with a set of rollers 19 projecting slightly above the top edges of the said parts of the combined elevating and lowering track.

Rigidly secured at its lower end to the upper end of each part 15 of a combined elevating and lowering track is a standard 20 having a bifurcated upper end 21 and with the inner faces of the arms provided by the furcation oppositely curved as indicated at 22, 23. See Figure 8. Seated in the curved inner faces 22, 23 is a globular member 24 provided with a diametrically disposed opening 25 and with the wall of the latter threaded.

Arranged adjacent the elements 8, 9 are posts 25, 26 respectively carrying on the inner faces, at the upper ends thereof bearing brackets 27, 28 respectively in which is arranged the globular ends 29, 30 respectively of a rotatable rod 31 provided with right and left threads 32, 33 respectively. The threads 32, 33 engage with the threaded walls of the globular members 24 seated in the upper ends of the standards 20. The rod 31 carries a gear or cog wheel 34 operated from a depending endless chain 35. When the shaft 31 is rotated in one direction the elements 8, 9 move on their hinges in opposite directions away from the track 1 and when shaft 31 is rotated in the opposite direction the elements 8, 9 move to the position shown in Figure 3. The purpose of shifting the elements 8, 9 in a direction away from opposite sides of the track 1 will be presently referred to.

The car 2 includes a chassis 36 provided with end sills 37. The side bars of the chassis 36 are indicated at 38, 39. Extending into the bars 38, 39 from the top thereof and in proximity to the sills 37 are spaced, parallel, upstanding rigid front and rear guide members 40, 41 respectively which are disposed in transverse relation with respect to the car track 1, and project laterally in opposite directions from the side bars of the chassis 36. Each guide member is formed centrally thereof with a vertical slot 42 opening at its lower end at the bottom edge and having a closed upper end 43 positioned in proximity to the top edge thereof.

The car 2 also includes a vertically movable body portion 44 of the open top and dumping bottom type. The dumping bottom of car 2 is formed of a pair of oppositely disposed sections 45, 46 having their outer sides free and their inner sides hinged, as at 47 to a shaft 48 which extends through the front and rear of body portion 44 and also through the slots 42 of the guide members 40, 41. The shaft 47 at each end carries a revoluble antifriction stop roller 49 capable of engaging either side wall of a slot 42 on the elevation and lowering of body portion 44. The diameter of each roller 49 is less than the width of either slot 42. The rollers 49 act to arrest the shifting of the body portion 44 in either direction relative to the guide members 40, 41. The rollers 49 are maintained upon shaft 48 by retainers 50. The shaft 48 is positioned in close proximity to the bottom edges of the front and rear of body portion 44.

On the outer face of each side 51 of the body portion 44 and between the longitudinal median and top edge of the side, as well as extending lengthwise of the latter, there is provided a cam element. The cam elements are of like form, of a length corresponding to the length of the body portion 44 and are indicated at 52, 53. Each of said elements are of angle shaped contour and comprises a pair of oppositely extending legs 55, 56. Each leg is of angle shaped cross section to provide a vertical and a horizontal flange with the vertical flange secured to the side of body portion 44 and the horizontal flange projecting outwardly at right angles from the bottom of the vertical flange. The legs 55, 56 are oppositely inclined relatively to each other. Each leg extends at an upward inclination from its lower to its upper end. The lower ends of the legs 55, 56 merge into each other. The leg 55 is the forward leg and coacts with the part 15 of a track 8 or 9 for elevating the body portion of the car during the travel of the latter from supports 11 towards supports 10. The leg 55 extends from a point between the vertical median and rear end of a side of the car body to the upper forward corner of such side. The leg 56 is termed a rear leg and coacts with parts 16 and 17 of the track 8 or 9 for lowering the body portion of the car after leg 55 clears the upper end of the part 15. The leg 56 extends downwardly from the rear upper corner of a side of the car body to a point between the vertical median and rear end of such side.

The outer face of each side of the body portion 44 has secured thereto a combined sustaining and cam element 57. The element 57 extends from a point forwardly of the vertical median of the side to the forward end of the latter. The element 57 inclines upwardly from its rear to its forward end and the inclination of element 57 corresponds to the inclination of leg 55. The element 57 is arranged below the forward portion of the leg 55. The element 57 is of materially less length than the length of leg 55. The element 57 coacts with the part 18 of the tracks 8 or 9 and assists in elevating and sustaining the weight of the body portion of the car prior to the lowering of such body portion, that is to say prior to the clearing of the part 15 of the tracks 8 or 9 by the leg 55 and the cam elements 52, 53.

The parts 15, 16, 17 and 18 of tracks 8 or 9 are connected together by rearwardly directed coupling plates 58 which are secured to the upper end of part 15, throughout the outer side of part 16, throughout the outer side of part 18 and to the upper end of part 17.

The elements 57 travel between the lower end of parts 16 and upper ends of parts 17 as such elements move forwardly on parts 18.

The sections 45, 46 of the dumping bottom of the car are sustained by rollers 59 carried by the side bars 38, 39 of the chassis. The rollers 59 are positioned at the tops of and project laterally with respect to said side bars. The rollers 59 sustain the bottom sections 45, 46 when in non-dumping position and in dumping position. With reference to Figure 4, the sections 55, 56 are shown in dumping position and the load is deflected outwardly with respect to the track rails 6, 7. The rollers 59 provide revoluble anti-friction supports for the bottom sections 45, 46. The front and rear axles of the car are indicated at 60, 61 and the front and rear wheels at 62, 63 respectively.

The rotatable screw 31 and its connection with the tracks 8 or 9 provide for shifting the tracks clear of the car 2 to enable the latter to pass between tracks 8 and 9 without the body portion of the car being vertically shifted to provide for dumping.

What I claim is:—

1. In combination, a dump car including a vertically shiftable body portion having a dumping bottom formed of a pair of oppositely extending sections hingedly supported at their inner sides from said body portion and normally held in non-dumping position when the body portion is in normal lowered position, a pair of spaced, parallel combined elevating and lowering elements between which the car travels, and cam means carried by the sides of said body portion and coacting with said elements for elevating and lowering said body portion to respectively release the bottom to dumping position and to restore the bottom to non-dumping position upon the travel of the car.

2. In combination, a dump car including a vertically shiftable body portion having a dumping bottom formed of a pair of oppositely extending sections hingedly supported at their inner sides from said body portion and normally held in non-dumping position when the body portion is in normal lowered position, a pair of spaced, parallel combined elevating and lowering elements between which the car travels, cam means carried by the sides of said body portion and coacting with said elements for elevating and lowering said body portion to respectively release the bottom to dumping position and to restore the bottom to non-dumping position upon the travel of the car, and means for shifting said elements clear of said cam means to prevent the elevating and lowering of said body portion.

3. In combination, a dump car including a vertically shiftable body portion having a dumping bottom formed of a pair of oppositely extending sections hingedly supported at their inner sides from said body portion and normally held in non-dumping position when the body portion is in normal lowered position, a pair of spaced, parallel combined elevating and lowering elements between which the car travels, and cam means carried by the sides of said body portion and coacting with said elements for elevating and lowering said body portion to respectively release the bottom to dumping position and to restore the bottom to non-dumping position upon the travel of the car, said elements provided with anti-friction rollers for said cam means.

4. In combination, a dump car including a vertically shiftable body portion having a dumping bottom formed of a pair of oppositely extending sections hingedly supported at their inner sides from said body portion and normally held in non-dumping position when the body portion is in normal lowered position, a pair of spaced, parallel combined elevating and lowering elements between which the car travels, cam means carried by the sides of said body portion and coacting with said elements for elevating and lowering said body portion to respectively release the bottom to dumping position and to restore the bottom to non-dumping position upon the travel of the car, and means for shifting said elements clear of said cam means to prevent the elevating and lowering of said body portion, said elements provided with anti-friction rollers for said cam means.

5. In combination, a dump car including a vertically shiftable body portion having a dumping bottom formed of a pair of oppositely extending sections hingedly supported at their inner sides from said body portion and normally held in non-dumping position when the body portion is in normal lowered position, a pair of spaced, parallel combined elevating and lowering elements between which the car travels, cam means carried by the sides of said body portion and coacting with said elements for elevating and lowering said body portion to respectively release the bottom to dumping position and to restore the bottom to non-dumping position upon the travel of the car, and said car including front and rear slotted guide members for said body portion.

6. In combination, a dump car including a vertically shiftable body portion having a dumping bottom formed of a pair of oppositely extending sections hingedly supported at their inner sides from said body portion and normally held in non-dumping position when the body portion is in normal lowered position, a pair of spaced, parallel combined elevating and lowering elements between which the car travels, cam means carried by the sides of said body portion and coacting with said elements for elevating and lowering said body portion to respectively release the bottom to dumping position and to restore the bottom to non-dumping position upon the travel of the car, means for shifting said elements clear of said cam means to prevent the elevating and lowering of said body portion, and said car including front and rear slotted guide members for said body portion.

7. In combination, a dump car including a mobile chassis, a vertically shiftable body portion arranged thereover and having a dumping bottom formed of a pair of oppositely extending sections hingedly supported at their inner sides from said body portion and normally held in non-dumping position by said chassis when the body portion is in lowered position, a pair of spaced, parallel combined elevating and lowering elements between which said car travels, and cam means carried by the sides of said body portion and coacting with said elements for elevating and lowering said body portion to respectively release the bottom to dumping position and to restore the bottom to non-dumping position during the travel of the car.

8. In combination, a dump car including a mobile chassis, a vertically shiftable body portion arranged thereover and having a dumping bottom formed of a pair of oppositely extending sections hingedly supported at their inner sides from said body portion and normally held in non-dumping position by said chassis when the body portion is in lowered position, a pair of spaced, parallel combined elevating and lowering elements between which said car travels, cam means carried by the sides of said body portion and coacting with said elements for elevating and lowering said body portion to respectively release the bottom to dumping position and to restore the bottom to non-dumping position during the travel of the car, said elements provided with anti-friction rollers for said cam means, and said chassis provided with anti-friction rollers for the sections of said bottom.

9. In combination, a dump car including a mobile chassis, a vertically shiftable body portion arranged thereover and having a dumping bottom formed of a pair of oppositely extending sections hingedly supported at their inner sides from said body portion and normally held in non-dumping position by said chassis when the body portion is in lowered position, a pair of spaced, parallel combined elevating and lowering elements between which said car travels, cam means carried by the sides of said body portion and coacting with said elements for elevating and lowering said body portion to respectively release the bottom to dumping position and to restore the bottom to non-dumping position during the travel of the car, said elements provided with anti-friction rollers for said cam means, said chassis provided with anti-friction rollers for the sections of said bottom, and means for shifting said elements clear of said cam means to prevent the elevating of said body portion upon the travel of the car between said elements.

10. In combination, a dump car including a mobile chassis, a vertically shiftable body portion arranged thereover and having a dumping bottom formed of a pair of oppositely extending sections hingedly supported at their inner sides from said body portion and normally held in non-dumping position by said chassis when the body portion is in lowered position, a pair of spaced, parallel combined elevating and lowering elements between which said car travels, and cam means carried by the sides of said body portion and coacting with said elements for elevating and lowering said body portion to respectively release the bottom to dumping position and to restore the bottom to non-dumping position during the travel of the car, said car further including front and rear slotted guide members for said body portion.

In testimony whereof, I affix my signature hereto.

MICHAEL RADZIEVICH.